(12) United States Patent
Mangan et al.

(10) Patent No.: US 11,221,444 B2
(45) Date of Patent: Jan. 11, 2022

(54) HOLLOW CORE OPTICAL FIBER AND METHOD OF MAKING THE SAME

(71) Applicant: OFS Fitel, LLC, Norcross, GA (US)

(72) Inventors: Brian Mangan, Hopewell, NJ (US); Gabriel Puc, Lebanon, NJ (US); Matt Corrado, Flemington, NJ (US); Tristan Kremo, Somerset, NJ (US)

(73) Assignee: OFS FITEL, LLC, Norcross, GA (US)

( * ) Notice: Subject to any disclaimer, the term of this patent is extended or adjusted under 35 U.S.C. 154(b) by 246 days.

(21) Appl. No.: 16/373,848

(22) Filed: Apr. 3, 2019

(65) Prior Publication Data

US 2020/0319399 A1 Oct. 8, 2020

(51) Int. Cl.
*G02B 6/02* (2006.01)
*C03B 37/027* (2006.01)

(52) U.S. Cl.
CPC ...... *G02B 6/02328* (2013.01); *C03B 37/0279* (2013.01)

(58) Field of Classification Search
CPC .. G02B 6/02328; G02B 6/09; C03B 37/0279; C03B 37/02781; C03B 37/0122; C03B 2203/14; C03B 2203/12; C03B 2203/42
See application file for complete search history.

(56) References Cited

U.S. PATENT DOCUMENTS

| | | | |
|---|---|---|---|
| 5,802,236 A * | 9/1998 | DiGiovanni | B82Y 20/00 385/125 |
| 7,366,388 B2 | 4/2008 | Roberts et al. | |
| 7,841,213 B2 * | 11/2010 | Kinoshita | C03B 37/02781 65/393 |
| 7,970,248 B2 * | 6/2011 | Dong | G01N 21/774 385/127 |
| 8,196,435 B2 * | 6/2012 | Mukasa | C03B 37/0122 65/382 |
| 9,904,008 B2 | 2/2018 | Fokoua et al. | |
| 9,971,087 B2 | 5/2018 | DiGiovanni et al. | |
| 10,302,809 B2 * | 5/2019 | Perkins | G01N 9/00 |
| 2005/0084223 A1 * | 4/2005 | Tanaka | G02B 6/02357 385/125 |
| 2006/0096325 A1 * | 5/2006 | Kinoshita | G02B 6/02361 65/393 |
| 2006/0120677 A1 * | 6/2006 | Broeng | G02B 6/02371 385/125 |
| 2013/0016743 A1 * | 1/2013 | Tanaka | H01S 3/06733 372/6 |

(Continued)

*Primary Examiner* — Andrew Jordan
(74) *Attorney, Agent, or Firm* — Wendy W. Koba, Esq.

(57) ABSTRACT

The selection of starting materials used in the process of forming an MCR is controlled to specifically define the physical properties of the core tube and/or the capillary tubes in the local vicinity of the core tube. The physical properties are considered to include, but are not limited to, the diameter of a given tube/capillary, its wall thickness, and its geometry (e.g., circular, non-circular). A goal is to select starting materials with physical properties that yield a final hollow core optical fiber with a "uniform" core region (for the purposes of the present invention, a "uniform" core region is one where the struts of cladding periodic array surrounding the central core are uniform in length and thickness (with the nodes between the struts thus being uniformly spaced apart), which yields a core wall of essentially uniform thickness and circularity.

19 Claims, 4 Drawing Sheets

(56) References Cited

U.S. PATENT DOCUMENTS

| | | | |
|---|---|---|---|
| 2016/0236964 A1 | 8/2016 | Fokoua et al. | |
| 2017/0045682 A1* | 2/2017 | Hoppe | G02B 6/02361 |
| 2017/0059740 A1* | 3/2017 | Perkins | G01N 11/00 |
| 2020/0317557 A1* | 10/2020 | Gibson | C03B 37/01217 |
| 2020/0319399 A1* | 10/2020 | Mangan | G02B 6/02328 |

* cited by examiner

HOLLOW CORE OPTICAL FIBER AND METHOD OF MAKING THE SAME

TECHNICAL FIELD

The present invention relates to hollow core photonic bandgap optical fiber and, more particularly, to fabrication techniques for improving the circularity and uniformity of the core region in this type of optical fiber.

BACKGROUND OF THE INVENTION

Light is confined within a hollow core optical fiber via the photonic band gap effect. This guidance mechanism is unique in that light can be confined to a core with a refractive index that is lower than the refractive index of the surrounding cladding material. The cladding of a hollow core optical fiber is formed by a periodic array of air holes that run longitudinally along the length of the fiber. With a sufficiently large enough diameter hole, an out-of-plane band gap is created. For the purposes of the present invention, a "band gap" is defined as a range of wavelengths and angles within the periodic array structure that cannot support any modes of a propagating optical signal. Therefore, any light incident on the periodic structure at an appropriate wavelength and angle will not have any modes of the structure to couple to and will be reflected. This can be thought of as similar to a multilayer stack mirror or a Bragg grating in a fiber.

A defect at the center of this periodic array of air holes, such as a larger-diameter hole, can be used to confine light. Light that is launched into this central defect will remain confined if there are no modes in the periodic array cladding for the light to couple to, so the propagation constant will be within the bandgap. The centrally-located defect in the periodic array of air holes forms the core of the optical waveguiding structure. In theory, light can be guided in such a core at all wavelengths within the band gap, which typically has a bandwidth of 300 nm in an air-silica band gap fiber that has been designed to operate at a wavelength of 1550 nm.

While theoretically possible to support propagation of optical signals across the full spectrum of wavelengths within the band gap, it has been found in practice that guiding light over the entire wavelength range of the band gap is difficult, due in part to surface mode crossings in the fiber. The surface modes, which are created within the high index material of the core wall located at the interface between the hollow core and periodic array cladding, create regions of high attenuation within the band gap wavelength window. Although the large air core is the intentional defect in the periodic array structure, the realities of fabrication have been found to introduce unwanted defects in the core wall. For example, variations in the physical properties of the core tube are known to occur in the drawing processes of forming a microstructured core rod (MCR), which are then perpetuated in the following process of drawing the MCR into the final hollow core fiber structure. These irregularities (i.e., non-uniformities in the physical topology) at this interface between core and cladding invite the propagation of surface modes that impact the optical properties of light propagating within the hollow core, affecting at least the attenuation, bandwidth and/or birefringence of the fiber.

SUMMARY OF THE INVENTION

The problems remaining in the prior art are addressed by the present invention, which relates to a hollow core photonic bandgap optical fiber and, more particularly, to modifications in the design of the core region of the fiber to reduce unwanted deformations during fabrication that otherwise impact performance factors.

In accordance with the principles of the present invention, the selection of starting materials used in the process of forming an MCR is controlled to use specifically-determined physical properties of the core tube and/or the capillary tubes in the local vicinity of the core tube. The physical properties of the capillary and core tubes (e.g., diameter, wall thickness, shape) are selected to minimize interstitial spacing between the core tube and the surrounding capillaries in the initial assembly used to fabricate the MCR. In configurations that also include shunt regions (smaller-sized "cores" disposed to surround the central core), the physical properties of the shunt tubes and capillary tubes are controlled as well. A goal is to select starting materials with physical properties that yield a final hollow core optical fiber with a "uniform" core region (for the purposes of the present invention, a "uniform" core region is one where the struts of cladding periodic array surrounding the central core (and shunt cores) are uniform in length and thickness (with the nodes between the struts thus being uniformly spaced apart), which yields a core wall of essentially uniform thickness and circularity.

In one embodiment of the present invention, an over-sized core tube is utilized as part of the initial assembly of capillary tubes (hereinafter referred to at times as simply as "capillaries") to minimize the interstitial spacing between the various capillaries closest to the hollow core in a manner that lessens the deformations at the interface between core and cladding during fabrication. The over-sized core tube requires the surrounding capillaries to adjust their spacing to form a more closely-packed arrangement around the perimeter of the core tube, thus reducing deformation of the core tube boundary.

In another embodiment of the present invention, a set of smaller-dimensioned capillaries (compared to standard practice) is used in the vicinity of the core (and possibly shunt) tube to control the physical properties of the periodic array in the final structure. The smaller-dimensioned capillaries may be used in conjunction with the above-mentioned over-sized core tube, which is an embodiment considered to simplify the initial assembly (with respect to the accommodation of the over-sized core tube) while still reducing the area of the largest voids, and hence deformations, between the capillaries and the core tube.

Alternative embodiments of the present invention contemplate the use of non-circular capillaries in the area surrounding the core tube (which may or may not be an over-sized tube).

An exemplary embodiment of the present invention takes the form of an assembly of glass tubes arranged in a predetermined pattern for drawing into a hollow core optical fiber including a cladding structure comprising a periodic array of air holes. The assembly comprises a plurality of capillary tubes and a core tube positioned at a central location within a central spacing of diameter d created within a collection of the plurality of capillary tubes. The combination of the plurality of capillary tubes and the core tube thus create an array structure, wherein selected ones of the plurality of capillary tubes and the core tube are sized to minimize an interstitial spacing between the core tube at a set of capillary tubes around an outer periphery of the core tube.

Yet another embodiment of the present invention relates to a method of fabricating a microstructured core rod for a hollow core photonic bandgap optical fiber, including the steps of: (1) arranging a stack of capillary tubes in an initial lattice configuration including a central hollow area of a predetermined diameter d; (2) placing an over-sized core tube in the central hollow area, the over-sized core tube having a diameter d+dd such that a set of capillary tubes re-position to reduce the area of the largest voids between the core and cladding (even if this means a small deviation of the surrounding, outer capillaries from their close-packed structure); and (3) drawing the assembly of capillaries and core tube into the microstructured core rod with the over-sized core tube forming a core wall comprising uniformly spaced-apart nodes with uniform length struts formed therebetween.

Other and further embodiments of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

Figure 2:
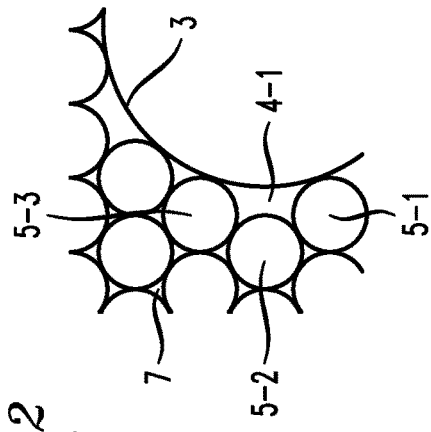
FIG. 2 is an enlargement of a portion of the assembly of FIG. 1, showing the interstitial spaces created around the periphery of the core tube.
Figure 1:
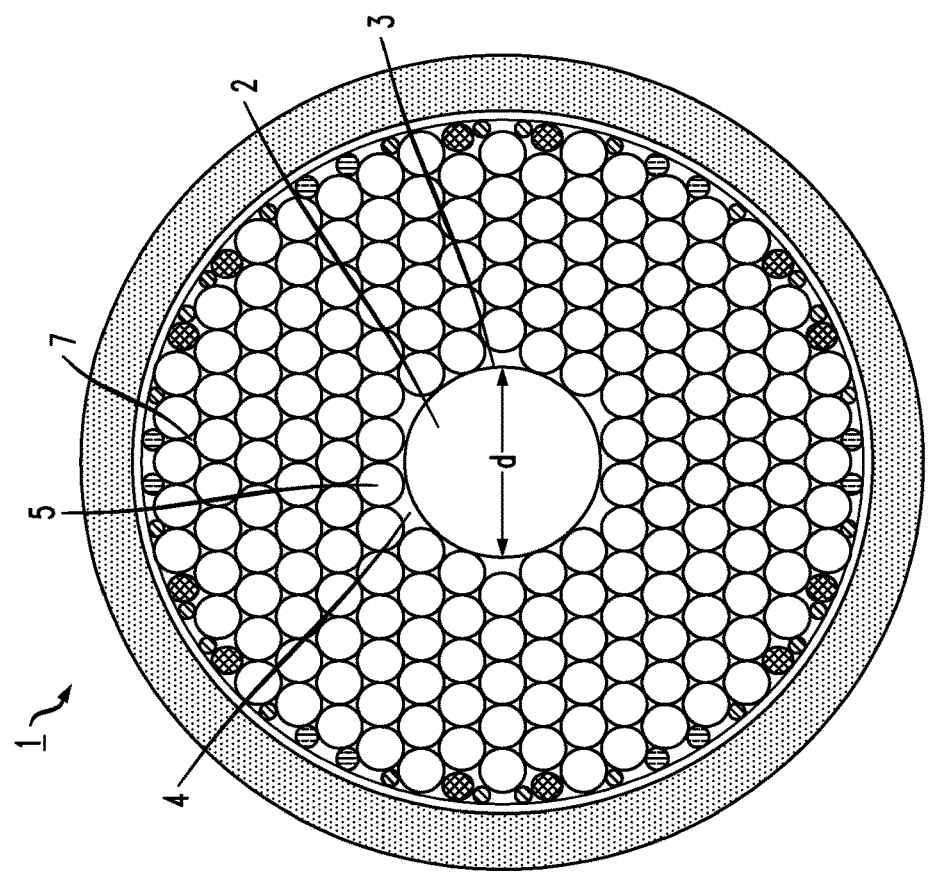
FIG. 1 is a schematic of a prior art assembly of tubes and rods used in the formation of a microstructured core rod (MCR)

An assembly of various capillary tubes and glass rods used to form a conventional hollow core optical fiber is shown in the prior art illustration of FIG. 1. The capillary tubes are represented as open circles and the rods (disposed around the outer periphery of the assembly) are represented as closed (filled-in) circles. In this particular assembly 1, a set of nineteen capillary tubes has been removed from the central area to define a hollow core region 2. A core tube 3 is inserted within this space and is used to support the structure during subsequent draw processes so as to maintain an open (hollow) core region 2. As shown in FIG. 1, core tube 3 does not completely fill the periphery of hollow core region 2, with interstitial spaces 4 remaining at various locations between core tube 3 and those capillaries 5 immediately adjacent to core tube 3. FIG. 2 is an enlargement of a portion of the structure shown in FIG. 1, clearly illustrating selected interstitial spaces 4 at the surface of core tube 3 (with capillaries 5-1, 5-2, and 5-3 surrounding a portion of interstitial space 4-1). For the specific structure of FIG. 1 with 19 central capillary tubes removed to form a core region with a diameter d, a total of six interstitial spaces are created.

Figure 3:
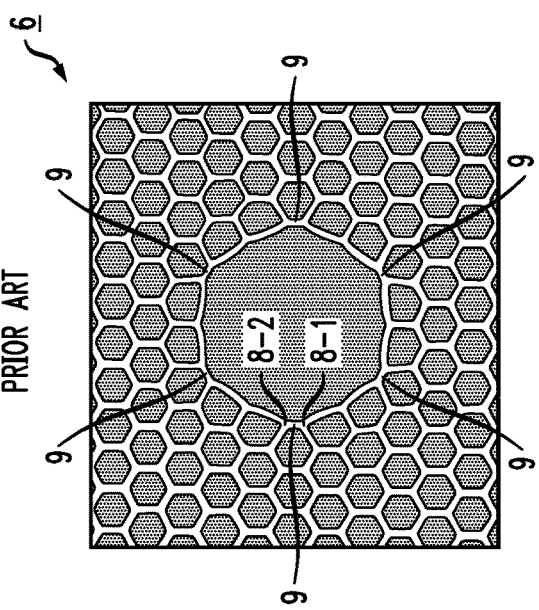
FIG. 3 is a micrograph of a prior art MCR formed from the assembly of FIG. 1.

FIG. 3 is a micrograph of a conventional optical fiber preform 6, referred to hereinafter as a microstructured core rod (MCR), that is drawn from the prior art assembly of FIG. 1. During the draw process, capillaries 5 may be sealed across their collected terminations on one end (referred to as the "top" of the assembly), and then loaded into a drawing tower where the bottom (open) surface of the assembly first passes through a heater. Preferably, a vacuum is applied during draw to collapse the relatively small spaces 7 (as shown in FIGS. 1 and 2) between those capillaries 5 positioned further away from core region 2.

At interstitial spaces 4, the adjacent capillaries (such as 5-1, 5-2, and 5-3) are shown in FIG. 3 as expanding to fill spaces 4 in the manner described above, bringing the closest portions of these capillaries and core tube 3 relatively close together (i.e., "pinching" together). This pinching can be seen between a pair of nodes 8-1 and 8-2, as shown in FIG. 3. The pinching functions to shorten (and thicken) a strut 9 between nodes 8-1 and 8-2. This same pinching and strut length reduction occurs at each interstitial space 4 around the periphery of core tube 3, forming a set of six (unwanted) pinched node locations that affect the circularity and uniformity of core tube 3 at the end of the MCR draw process. FIG. 3 clearly depicts this complete set of pinched nodes and struts and the associated deformation in the circularity and uniformity of core tube 3. These deformations in core tube 3 are carried over into the structure of the core wall in the final fiber drawn down from this MCR.

It has been found that the node pinching and strut reduction around the core wall of the final fiber supports the propagation of (unwanted) surface modes within the high index material of the core wall. Indeed, a limiting factor in quantifying the performance of a hollow core optical fiber has found to be related to strut length, with the overall performance of the fiber related to the shortest strut length of the fiber.

The pinching distortion as shown in MCR 6 illustrated in FIG. 3 cannot be easily corrected during the subsequent fiber draw. The core region is known to contract and expand relative to the rest of the structure when the MCR is drawn down into the final hollow core fiber structure. This contraction of the core increases for fibers drawn with higher temperature and larger diameters. The nodes surrounding the core move even closer together when the core reduces in diameter during the final draw into a fiber. Moreover, if two of the adjacent nodes touch during the draw process, they will not later be able to be separated and as a result the two nodes become a single large node at the core wall boundary. This large node thus functions as an additional unwanted defect at the core wall and significantly impacts the optical properties of the final fiber structure.

For optimal performance, the nodes around the core wall in the MCR should be evenly spaced so that during the draw they retain the same relative spacing around the core wall perimeter and the contraction and expansion of the struts in the core wall is uniform and symmetric. Clearly, the requirement for even node spacing comes along with the requirement for uniform strut length in the region surrounding the core wall.

In accordance with the present invention, it is proposed to use an assembly of capillaries and core tube with physical parameters (diameter, wall thickness, etc.) that minimize the size of the interstitial spacing between the core tube and the surrounding capillaries in the initial assembly. Increasing the "packing density" around the core tube ultimately results in a hollow core optical fiber with a relatively circular core region and uniform core wall, thereby minimizing the opportunity for surface modes to propagate and degrade the performance of the hollow core fiber.

In one embodiment of the present invention, the assembly of capillaries and core tubes comprises a set of conventional capillaries used in combination with an over-sized core tube (over-sized in terms of having a diameter slightly larger than that typically used in MCR fabrication). The typical core tube diameter is selected based on the number of capillaries removed from the initial assembly to form the core. It has been found that the use of an over-sized core tube forces the capillaries in the vicinity to adjust their positions so that they all fit around the larger core, reducing the area of the largest interstitial spaces around the core. The reduction in the size of the interstitial spaces limits the degree of capillary expansion that occurs during MCR draw and thus reduces the pinching effect at the core tube, maintaining an acceptable spacing between adjacent nodes as well as acceptable strut size between these nodes. While it is not necessary that the complete set of nodes be uniformly spaced, the optical properties of the final hollow core fiber are ultimately limited by the minimum strut length between adjacent nodes (such as strut 9 shown in prior art MCR 6 in FIG. 3). Therefore, any process improvement that increases the minimum strut length will allow for an improvement in the fiber's performance.

Figure 4:
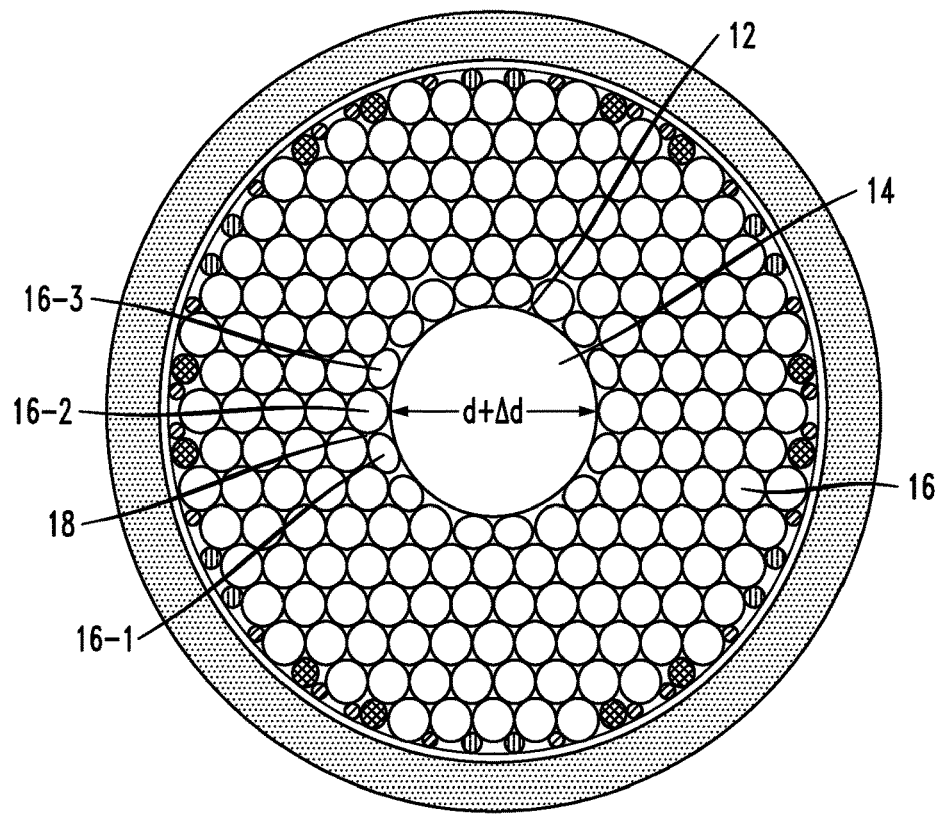
FIG. 4 is a schematic of an assembly of tubes and rods used to form an MCR in accordance with the principles of the present invention, the assembly including an over-sized core tube positioned in the central hollow region of the assembly.

FIG. 4 illustrates an exemplary hollow core optical fiber assembly 10 formed in accordance with this embodiment of the present invention, utilizing an over-sized (i.e., large diameter) core tube 12 at the boundary between core region 14 and capillaries 16 in order to reduce interstitial spacing around the periphery of the tube. In accordance with the principles of the present invention, the use of over-sized core tube 12 causes capillaries 16 in the assembly to adjust their individual positions so as to absorb the disturbance to the perfect lattice (crowding) created by the inclusion of the large diameter core tube. This adjustment results in creating interstitial spaces 18 that are smaller in size than spaces 4 found in prior art configurations (see FIG. 1).

In comparing the assemblies of FIGS. 1 and 4, core tube 3 of the prior art assembly 1 is defined as having a given diameter d, typically defined by the number of capillaries removed from the central region of the bundle. Core tube 12 of assembly 10 of the present invention is shown as having a diameter defined as "d+Δd", where the addition of as little as 3-5% to the diameter of the prior art core tube has been found to improve the circularity and uniformity of the MCR, as well as the hollow core optical fiber ultimately formed from the assembly (although other increases used for Δd may be used, as necessary; for example, values of about 8% or 10% may be appropriate for specific applications). In particular, the use of an over-sized core tube prevents neighboring nodes of capillaries from joining to each other, as well as joining to the core wall, which results in reducing deformations imparted onto the core tube during MCR and fiber fabrication processes.

The smaller interstitial spaces 18 in the inventive assembly using over-sized core tube 12 thus limit the amount of expansion that can take place for capillaries surrounding these spaces during the MCR draw process (e.g., capillaries 16-1, 16-2, and 16-3 surrounding interstitial space 18-1). Indeed, during the draw process of forming an MCR from the assembly as shown in FIG. 4, capillaries 16-1, 16-2, and 16-3 will tend to retain their shape (at most deforming into pentagonal form), with the nodes 24 maintaining their separate forms and retaining struts 22 spanning the distance between a pair of adjacent nodes.

Figure 5:
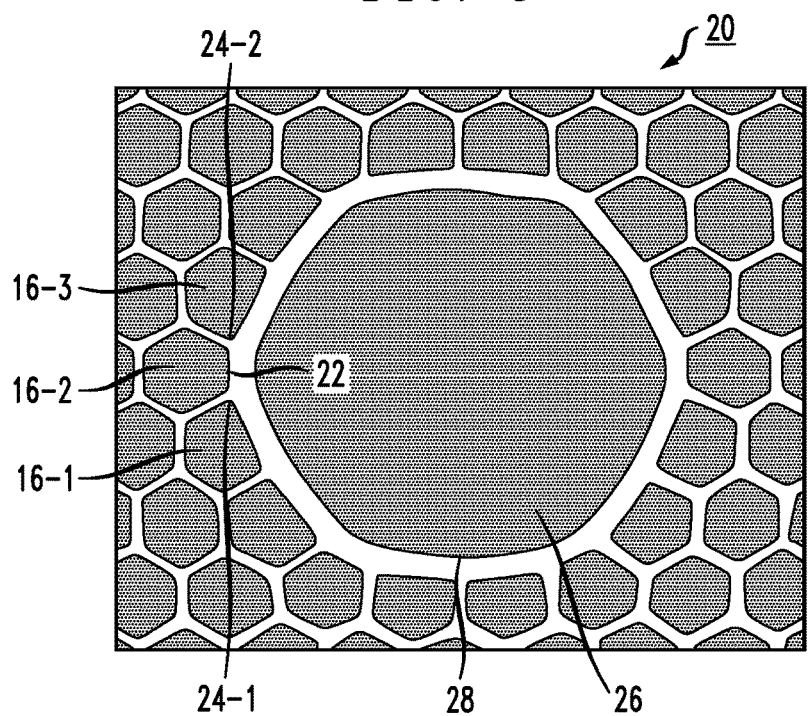
FIG. 5 is a micrograph of an MCR fabricated from the assembly of FIG. 4, including the over-sized core tube.

FIG. 5 is a micrograph of an MCR 20 fabricated from an assembly such as shown in FIG. 4. A careful study of FIG. 5 shows that struts 22 remain relatively intact between adjacent nodes 24 (as compared to pinched nodes 8 and struts 9 of prior art MCR 6 shown in FIG. 3). A comparison of the core regions shows that core region 26 of MCR 20 exhibits improvements in both uniformity (for example, in terms of the uniform thickness of core wall 28) and circularity over core region 2 of prior art MCR 6.

While the use of an over-sized core tube is one embodiment of the present invention that improves the uniformity and circularity of the core region, it may be difficult to incorporate an over-sized core tube into the standard initial process of assembling the tubes and rods used to create the MCR. The fact that the capillaries are held in an array structure during assembly ensures uniformity in the structure; the addition of the larger-diameter core tube is perhaps counter to maintaining the array structure and may introduce unwanted stress along various interfaces as the remaining capillaries attempt to adjust their positions.

Figure 6:
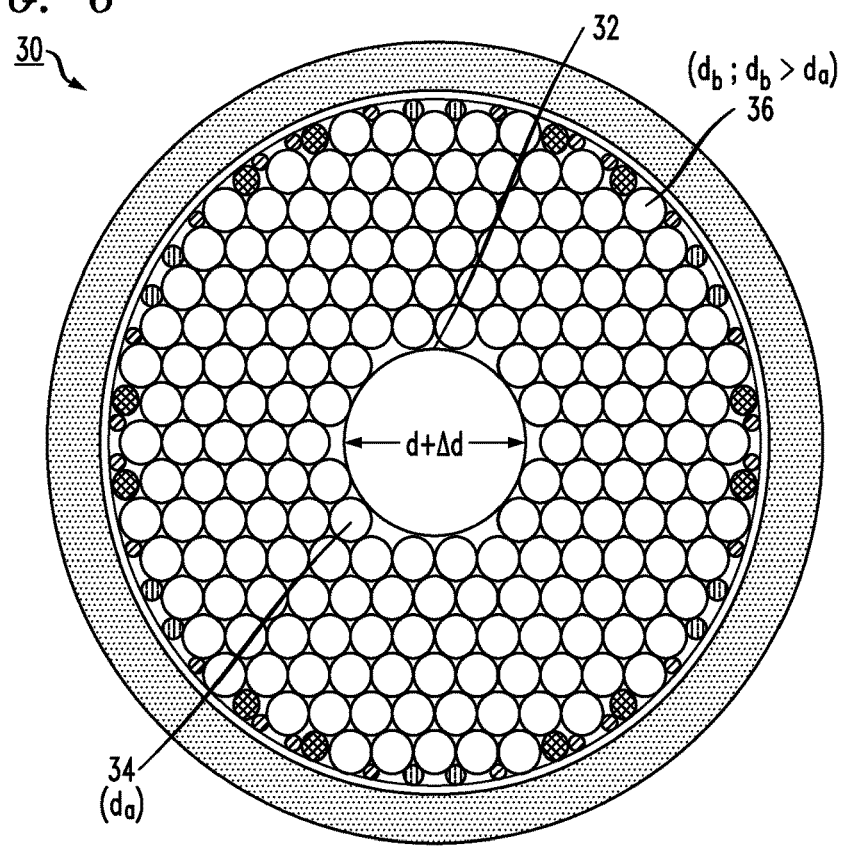
FIG. 6 is a schematic of an alternative embodiment of the present invention, in this case utilizing a set of small diameter capillary tubes in the area surrounding the over-sized core tube.

These issues are addressed in an alternative embodiment of the present invention, as shown in FIG. 6. Here, an assembly 30 including an over-sized core tube 32 is further modified to utilize a set of small diameter capillaries 34 (shown as having a first diameter $d_a$) at locations around the periphery of over-sized core tube 32. Capillaries 36 of a conventional diameter $d_b$ ($d_b > d_a$) are used as before in the further-removed portions of assembly 30. It has been found that the inclusion of small diameter capillaries 36 improves the manufacturability of the hollow core fiber when using the inventive over-sized core tube, without sacrificing the improvements associated with reducing the interstitial spacing. That is, the smaller capillaries better accommodate the introduction of the over-sized core tube and reduce the stresses on surrounding capillaries adjusting their positions to account for the over-sized core tube. The use of smaller capillaries, when compared to those in the outer area of the cladding, results in decreasing the diameter of the capillaries that form the pentagonal holes around the core region.

Figure 7:
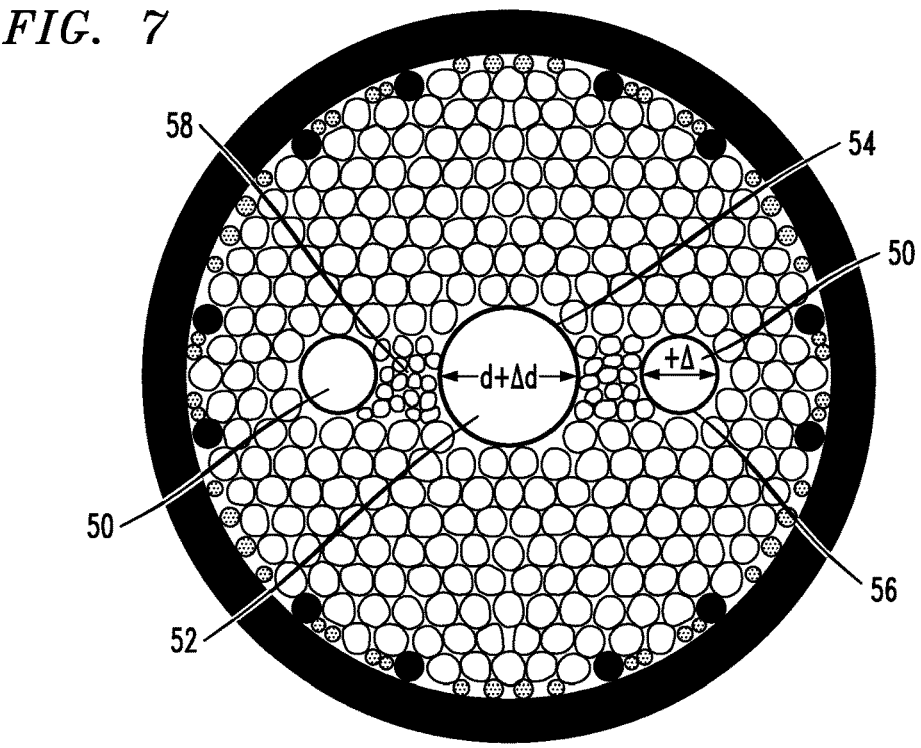
FIG. 7 is a schematic of yet another embodiment of the present invention, in this case illustrating an assembly of tubes and rods used to form an MCR having additional shunt regions surrounding the central hollow core, with over-sized shunt tubes used to improve the circularity and uniformity of the shunt areas.

FIG. 7 illustrates another type of hollow core fiber that may benefit from using specifically-sized tubes in the initial assembly in accordance with the principles of the present invention. The assembly as shown includes a pair of shunts 50 disposed on either side of a core region 52. Shunts 50 are also hollow regions, typically of somewhat smaller diameter than central core region 52 and are used to out-couple unwanted propagating modes from central core region 52. In this particular embodiment, an over-sized core tube 54 is used to define the boundary of central core region 52. Additionally, a pair of over-sized shunt tubes 56 is used to define the boundaries of shunts 50. Small-diameter capillaries 58 are included in the area between central core region 52 and shunts 50 to improve the manufacturability and reduce the stress present in the initial assembly as the remaining tubes re-arrange themselves to absorb the disturbance to the lattice introduced by the over-sized tubes. The ability to improve the uniformity and circularity of shunts 50 in accordance with the present invention provides better control in defining the specific unwanted higher-order modes that are removed from central core region 52 through phase matching to the fundamental modes of shunts 50. The improvement in maintaining a strut span between adjacent node positions around over-sized shunt tubes 56 also increase the bandwidth of shunts 50 and reduce the shunt surface mode content which couple to, and increases the loss of, the desired fundamental mode propagating in central core region 52.

Figure 8:
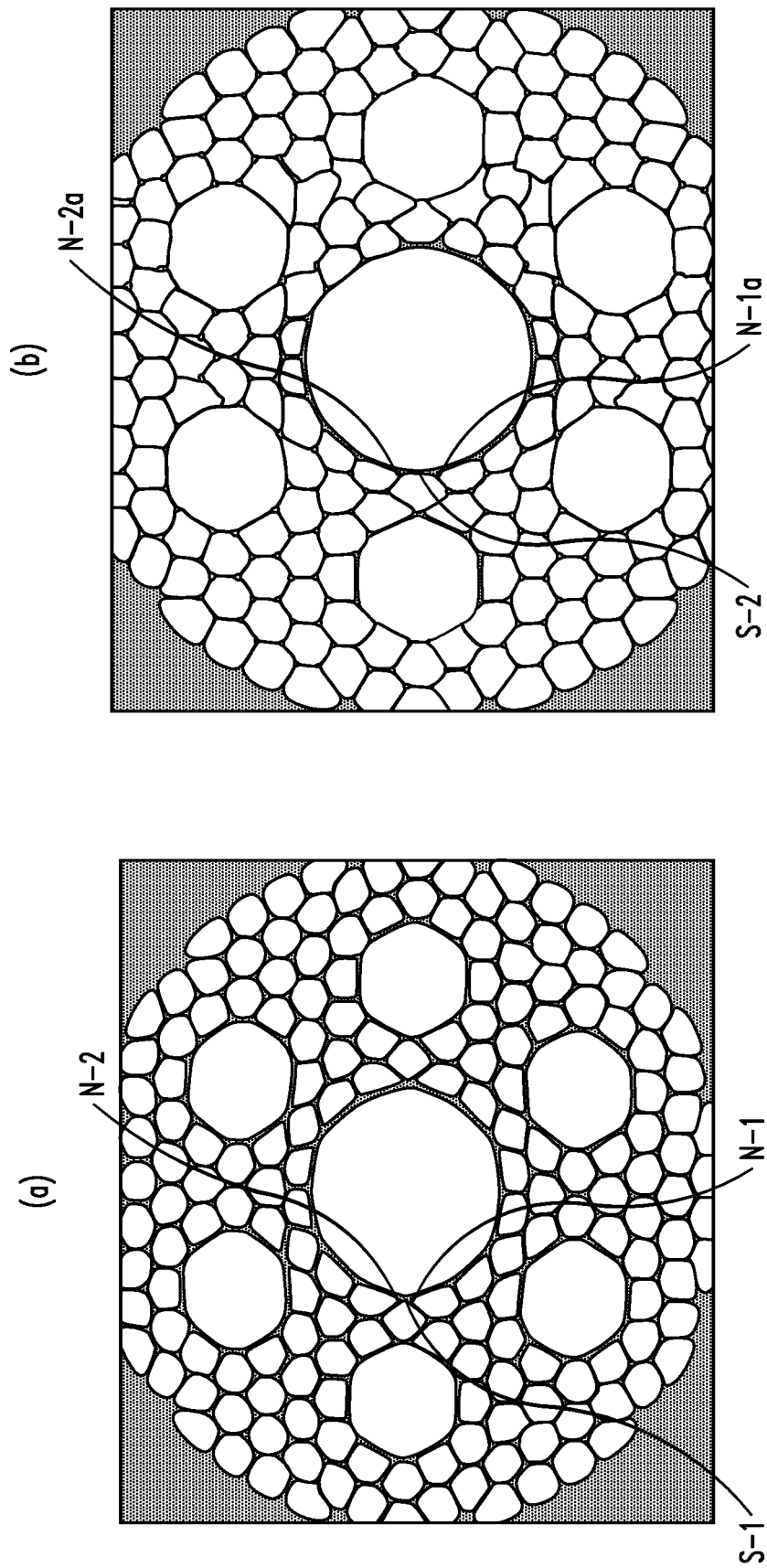
FIG. 8 contains a pair of micrographs of hollow core drawn optical fibers, with micrograph (a) illustrating a conventional prior art hollow core optical fiber and micrograph (b) illustrating an improved hollow core optical fiber drawn from an MCR formed in accordance with the principles of the present invention.

It is to be understood that improvements in the structure of an MCR in accordance with the teachings of the present invention are carried forward into the structure of the optical fiber that is ultimately drawn from the MCR. FIG. 8 illustrates this aspect, with micrograph (a) illustrating an optical fiber drawn from a conventional MCR and micrograph (b) illustrating an optical fiber drawn from an MCR formed in accordance with the present invention. The improvement in the physical appearance of the hollow core area of the fiber drawn from the inventive MCR (micrograph (b)) is quite evident. In particular, reference is made to strut S-1 of micrograph (a), which clearly shows that nodes N-1A and N-1B have essentially pinched together and minimized the length of struct S-1 to only the area occupied by the joined nodes. In comparison, strut S-2 of the inventive configuration (micrograph (b)) is shown as maintaining a substantial length, with adjacent nodes N-2A and N-2B remaining spaced apart as desired. Indeed, it is clearly shown that all of the struts in the region surrounding the core exhibit essentially the same length, forming a uniform (and circular) core wall.

As mentioned above, deviations from circularity have been found to impact to the optical properties of the hollow core fiber. The arrangements of the present invention thus keep these deviations to a minimum.

Summarizing, the present invention proposes both a method of fabricating a hollow core optical fiber preform, as well as the fiber formed from this fabrication process. By modifying the initial selection of capillary and core tubes to create a structure with minimally-sized interstitial spacings around the core (both central and shunt, when present), the subsequent steps of heating and drawing the flowing glass material creates a final fiber with an essentially uniform and circular core region. The initial selection involves one or more of using an over-sized core tube, over-sized shunt tube(s), smaller capillaries around the core, and perhaps non-circular capillaries around the core.

All of these variations associated with reducing interstitial spacing are contemplated to fall within the scope of the present invention, which is defined only by the scope of the claims appended hereto.

What is claimed is:

1. An assembly of glass tubes arranged in a predetermined pattern for drawing into a hollow core optical fiber including a cladding structure comprising a periodic array of air holes, the assembly comprising
    a plurality of capillary tubes; and
    a core tube positioned at a central location within a central spacing of diameter d created within a collection of the plurality of capillary tubes, the combination of the plurality of capillary tubes and the core tube collected to create an array structure, wherein selected ones of the plurality of capillary tubes and the core tube are sized to minimize an interstitial spacing between the core tube and those capillary tubes positioned adjacent to an outer periphery of the core tube, the minimal interstitial spacing yielding a drawn hollow core optical fiber with an essentially uniform thickness core wall and circular opening, preventing propagation of surface modes along the core wall.

2. The assembly as defined in claim 1 wherein the selected ones of the plurality of capillary tubes and the core tube include an over-sized core tube comprising a diameter of (d+$\Delta$d), where $\Delta$d has a value within a range of about 2% to 10% of the diameter d.

3. The assembly as defined in claim 1 wherein the selected ones of the plurality of capillary tubes and the core tube include a first set of capillary tubes disposed around the core tube having a diameter less than a second set of capillary tubes forming the remainder of the plurality of capillary tubes.

4. The assembly as defined in claim 1 wherein the selected ones of the plurality of capillary tubes and the core tube include a set of non-circular capillary tubes disposed around the core tube.

5. The assembly as defined in claim 1 wherein the selected ones of the plurality of capillary tubes and the core tube including both an over-sized core tube comprising a diameter of (d+$\Delta$d), where $\Delta$d is about 2-10% of d, and a first set of capillary tubes disposed around the core tube having a diameter less than a second set of capillary tubes forming the remainder of the plurality of capillary tubes.

6. The assembly as defined in claim 1 wherein the assembly further comprises at least one shunt tube disposed within the array structure at a location displaced from the core tube, for out-coupling selected propagating optical modes from the hollow core region.

7. The assembly as defined in claim 6 wherein the at least one shunt tube exhibits an enlarged diameter for minimizing interstitial spacing between the at least one shunt tube and capillary tubes of the plurality of capillary tubes disposed adjacent to the at least one shunt tube.

8. The assembly as defined in claim 7 wherein the selected capillary tubes include sets of small diameter capillary tubes disposed between the core tube and the at least one shunt tube.

9. A method of fabricating a microstructured core rod for a hollow core photonic bandgap optical fiber, comprising:
    a) arranging a stack of capillary tubes in an initial lattice configuration including a central hollow area of a predetermined diameter d;
    b) placing an over-sized core tube in the central hollow area, the over-sized core tube having a diameter d+$\Delta$d such that a set of capillary tubes surrounding the over-sized core tube re-position closer together than the initial lattice configuration; and
    c) drawing the arrangement formed in step b) into the microstructured core rod with the over-sized core tube forming a core wall comprising essentially uniformly spaced-apart nodes with substantially uniform length struts formed therebetween to prevent propagation of surface modes along the core wall.

10. The method as defined in claim 9 wherein $\Delta$d is in the range of about 2-10% of d.

11. The method as defined in claim 10 wherein $\Delta$d is in the range of about 8%.

12. The method as defined claim 10 wherein $\Delta$d is in the range of about 3-5%.

13. The method as defined in claim 9 wherein step a) includes:
    positioning a first set of capillary tubes with a first diameter $d_1$ at selected locations around the over-sized core tube; and positioning a second set of capillary tubes with a second diameter $d_2 > d_1$ at remaining locations to form the initial lattice configuration.

14. The method as defined in claim 9 wherein step a) includes:
forming additional hollow shunt areas spaced apart from the central hollow area, the additional hollow areas having a diameter $d_{shunt} < d$.

15. The method as defined in claim 14 wherein the method further includes the step of placing over-sized shunt tubes in each additional hollow shunt area prior to performing step c).

16. The method as defined in claim 15 wherein step a) includes:
placing a first set of capillary tubes of a diameter $d_a$ in areas between the over-sized core tube and the over-sized shunt tubes; and
placing a second set of capillary tubes of a diameter $d_b$ around the first set of capillary tubes to form the initial lattice configuration.

17. A method of fabricating a microstructured core rod for a hollow core photonic bandgap optical fiber, comprising the steps of:
a) arranging a stack of capillary tubes in an initial lattice configuration including a central hollow area of a predetermined diameter d, the stack of capillary tubes including a first set of capillary tubes with a first diameter $d_1$ positioned immediately adjacent to the central hollow area and a second set of capillary tubes with a second diameter $d_2 > d_1$ positioned at remaining locations to form the initial lattice configuration;
b) placing a core tube in the central hollow area, wherein the first set of capillary tubes are disposed in a close-packed formation with the core tube, exhibiting minimal interstitial spacing therebetween; and
c) drawing the assembly formed in step b) into the microstructured core rod with the core tube forming a core wall comprising uniformly spaced-apart nodes with uniform length struts formed therebetween.

18. The method as defined in claim 17 wherein in performing step b), the step includes placing an over-sized core tube in the central hollow area.

19. A method of fabricating a microstructured core rod for a hollow core photonic bandgap optical fiber, comprising:
arranging a stack of capillary tubes in an initial lattice configuration including a central hollow area of a predetermined diameter d, the stack of capillary tubes including a set of non-circular capillary tubes positioned immediately adjacent to the central hollow area and a set of circular capillary tubes positioned at remaining locations to form the initial lattice configuration;
placing a core tube in the central hollow area, wherein the set of non-circular capillary tubes are disposed in a close-packed formation with the core tube, exhibiting minimal interstitial spacing therebetween; and
drawing the close-packed lattice into the microstructured core rod with the core tube forming a core wall comprising uniformly spaced-apart nodes with uniform length struts formed therebetween.

* * * * *